(12) United States Patent
Peterson et al.

(10) Patent No.: US 7,397,603 B2
(45) Date of Patent: Jul. 8, 2008

(54) DEPLOYABLE PROJECTION SCREEN

(75) Inventors: Mark D. Peterson, Lake Oswsego, OR (US); William L. Emery, Sherwood, OR (US); Jason Kuhn, Hillsboro, OR (US)

(73) Assignee: Infocus Corporation, Wilsonville, OR (US)

( * ) Notice: Subject to any disclaimer, the term of this patent is extended or adjusted under 35 U.S.C. 154(b) by 0 days.

(21) Appl. No.: 11/381,895

(22) Filed: May 5, 2006

(65) Prior Publication Data

US 2006/0250692 A1 Nov. 9, 2006

Related U.S. Application Data

(60) Provisional application No. 60/678,635, filed on May 5, 2005.

(51) Int. Cl.
G03B 21/56 (2006.01)
G02B 7/00 (2006.01)
A47H 23/00 (2006.01)

(52) U.S. Cl. ............ 359/443; 359/461; 359/896; 359/900; 160/354

(58) Field of Classification Search .......... 359/443, 359/461, 446, 896, 900; 160/354
See application file for complete search history.

(56) References Cited

U.S. PATENT DOCUMENTS 4,106,852 A 8/1978 Chasins
4,815,784 A 3/1989 Zheng
5,116,273 A * 5/1992 Chan .................. 160/370.21
6,008,938 A 12/1999 Suehle
6,466,369 B1 * 10/2002 Maddock ................ 359/460
2005/0270644 A1 * 12/2005 Devos et al. ............. 359/461

OTHER PUBLICATIONS

Open Air Cinema, "Inflatable Outdoor Movie Screens," internet article, retrieved Aug. 30, 2006, www.summercinema.com/screensales.html.
Signweb, "Inflatable Screens, Boards," internet article, retrieved Aug. 30, 2006, www.signweb.com/design/rods/blimp;sign.html.
Da-lite, "Tensioned Contour Electrol," internet article, retrieved Aug. 30, 2006, www.dalite.com/products/product.php?cID-29&pID-289.
Draper, "Premier Motorized Screen with Tab Tensioning System," internet article, retrieved Aug. 30, 2006, www.draperinc.com/images/2005Catalogs/ScreenSweets/Premier.
Photography-Lighting.Com, "Photography light reflectros and lighting reflector kit page," internet catalog, retrieved Aug. 30, 2006, www.photography-lighting.com/reflectros.htm.

* cited by examiner

Primary Examiner—Diane I. Lee
Assistant Examiner—Magda Cruz
(74) Attorney, Agent, or Firm—Schwabe Williamson Wyatt (57) ABSTRACT

Embodiments of apparatuses, methods and systems for deployable projection screens are generally described herein. Other embodiments may be described and claimed.

15 Claims, 6 Drawing Sheets

DEPLOYABLE PROJECTION SCREEN

CROSS REFERENCE TO RELATED APPLICATION

The present application claims priority to U.S. Provisional Application No. 60/678,635, filed May 5, 2005, entitled "PROJECTION SCREENS," the entire contents of which is hereby incorporated by reference.

FIELD

Disclosed embodiments of the present invention relate to the field of projection systems, and more particularly to the use of a deployable projection screen in such systems.

BACKGROUND

Projection systems project images from a small display, or light valve, found in a projection device, onto a viewing surface. Although the viewing surface may be any flat surface, using a projection screen as the viewing surface may facilitate reflection of the projected image with detail and contrast suitable for viewing over a wide range of angles. A high-quality projection screen will typically reject a substantial portion of the ambient light surrounding the projection system, while still providing sufficient viewing angles of the projected image.

The images projected by projection systems are capable of being very large, which, in turn, corresponds to the use of a large projection screen. However, some users may find a large projection screen distracting while not in use.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION

In the following detailed description reference is made to the accompanying drawings that form a part hereof, wherein like numerals designate like parts throughout, and in which is shown, by way of illustration, specific embodiments in which the invention may be practiced. It is to be understood that other embodiments may be utilized and structural or logical changes may be made without departing from the scope of the embodiments of the present invention. Directions such as up, down, back, and front may be used in the discussion of the drawings. These directions are used to facilitate the discussion and are not intended to restrict the application of embodiments of this invention. Therefore, the following detailed description is not to be taken in a limiting sense.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A)B" means "(B) or (A and B)," that is, A is optional.

Various embodiments of the present invention include projection screens designed to be flat in a deployed state, yet disappear into a structure while in a stored state. Embodiments described and discussed below may be employed in front- and/or rear-projection systems.

Figure 1A:
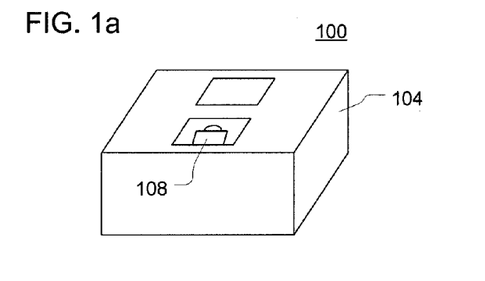
FIGS. 1a-1c illustrate perspective views of a projection system in accordance with an embodiment of the present invention.

FIG. 1a illustrates a perspective view of a projection system 100 including a housing 104 containing a projection device 108, in accordance with an embodiment of the present invention. The housing 104 may be a piece of furniture, e.g., a coffee table. In one embodiment the projection device 108 may be recessed within a projector cavity of the housing 104 and covered with a transparent or a removable cover. During use, the projection device 108 may operate from within the projector cavity, or it may be extended outward by a certain amount.

Figure 1B:
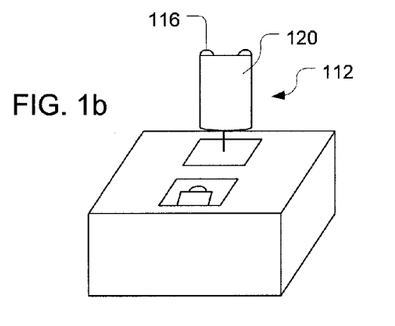

Deployment of a projection screen 112 is shown in an intermediate state in FIG. 1b in accordance with an embodiment of the present invention. The projection screen 112 may include rollers 116 and screen material 120. The screen material 120 may have optical attributes suitable to at least facilitate viewing of an image projected thereon. These optical attributes may include, for example, gain, contrast (e.g., ambient light rejection), resolution, uniformity, projection format, etc.

Furthermore, the projection screen 112 may have physical attributes suitable to facilitate repeated transitions between contracted storage (or "stored") state and an expanded projection (or "deployed") state without materially affecting optical attributes of the screen material. The physical attributes may include, for example, flexibility, noncreasing, pliability, etc.

Values of these attributes (both physical and optical) may be provided with respect to design constraints and/or objectives of a particular embodiment.

Figure 1C:
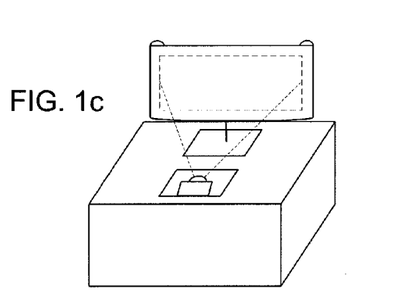

The rollers 116 may unroll the screen material 120 into the deployed state depicted in FIG. 1c. A frame (not shown) may be coupled to the rollers 116 to facilitate the deployment and support of the projection screen 112. The frame may be automatic or manually operated. In one embodiment, the frame may include a scissor-jack design.

With the projection screen 112 fully deployed, the projection device 108 may project an image for viewing. In various embodiments, the projection screen 112 and/or the projection device 108 may be adapted to accommodate the relative positioning of the two components. For example, the projection device 108 may be a steep-angled projection device to accommodate for the relative closeness of the two components.

In an embodiment the relative positioning of the projection device 108 and the projection screen 112 may be adjusted to, e.g., provide for a larger/smaller projected image. The adjustment of the relative positioning may be done by moving the projection screen 112 and/or the projection device 108.

In an embodiment, a second projection screen (not shown) may be adapted to be deployed at a second distance from the projection device 108 to accommodate a different image size than the projection screen 112. In this embodiment, a user may view a smaller image, e.g., for watching a television program, on the projection screen 112, or a larger image on the second screen, e.g., for watching a video in a wide-screen display format, that is further from the projection device 108.

Figure 2A:
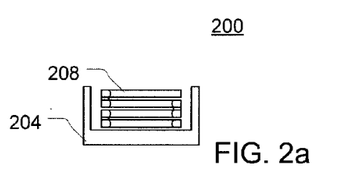
FIGS. 2a-2c illustrate a side view of a foldable projection screen transferring between a stored state and a deployed state, in accordance with an embodiment of the present invention.

FIG. 2a illustrates a side view of a foldable projection screen 200 stored within a housing 204, in accordance with an embodiment of the present invention. The projection screen 200 and housing 204 may be substantially interchangeable with the like-named elements discussed above with reference to the projection system 100.

In this embodiment, the projection screen 200 may include slats 208. The slats 208 may provide a supportive substrate for the projection screen material disposed on one side of the slats 208. Each of the slats 208 may be coupled to an adjacent slat 208 by a hinge 212 at the edge. In one embodiment the type of hinge used may have two pivot points so that it may fold in both directions.

Figure 2B:
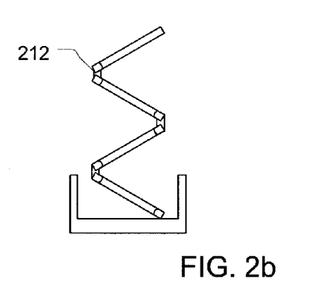
Figure 2C:
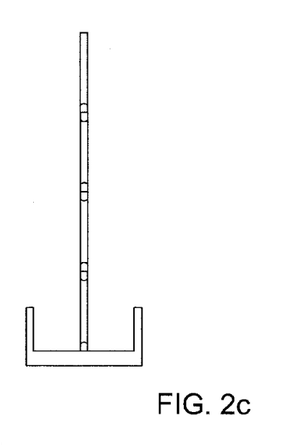

In one embodiment, the projection screen 200 may have one or more bi-stable springs designed to facilitate the transition of the projection screen from the stored state depicted in FIG. 2a, through an intermediate state depicted in FIG. 2b, to the deployed state depicted in FIG. 2c, and back. In various embodiments, the spring(s) may be embedded within the slats 208 or placed on the backside of the screen (backside being the side opposite the viewing side).

In one embodiment, the screen material may be loosely coupled to the slats 208. For example, in one embodiment, the screen material may be coupled to the top edge of the top slat 208 and the bottom edge of the bottom slat 208. When the projection screen 200 is deployed, the screen material may be stretched taut across one side of the slats 208. In other embodiments, the screen material may be coupled more closely to the slats 208, e.g., directly adhered to at least a portion of the face of the slats 208.

Figure 3:
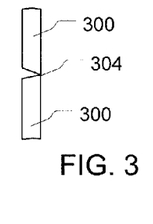
FIG. 3 illustrates a side view of a joint between two adjacent slats of a foldable projection screen, in accordance with an embodiment of the present invention.

In one embodiment, e.g., the embodiment depicted in FIG. 3, the adjoining edges of slats 300, which may be substantially interchangeable with slats 208, may be geometrically designed to reduce the spacing at a junction 304 between adjacent slats 300 viewed from the front while they are in the deployed state. So designed, the surface of adjoining slats may be substantially flush with one another giving the appearance of a substantially continuous viewing surface. In this embodiment, the slats 300 are angled to pinch together at the junction 304.

Figure 4:
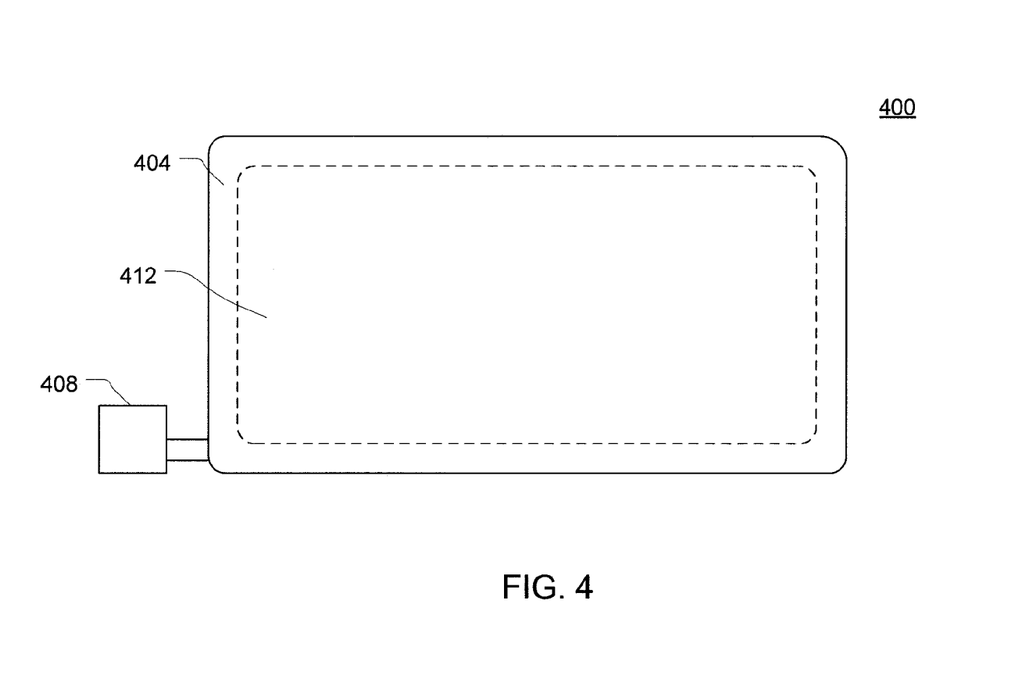
FIG. 4 illustrates a front view of a projection screen having an inflatable frame, in accordance with an embodiment of the present invention.

FIG. 4 illustrates a front view of a projection screen 400 having an inflatable frame 404, in accordance with an embodiment of the present invention.

The frame 404 may be coupled to a mechanical actuator, e.g., a pump 408. In an embodiment, the pump 408 may be a high volume low pressure (HVLP) pump. As the pump 408 is activated, the frame 404 may fill with air and provide a sufficiently rigid structure. The projection screen material 412, which may be adhered to the frame 404, may become suitably taut upon inflation of the frame 404.

In an embodiment, the deployed projection screen 400 may have a form factor suitable for indoor viewing. For example, the projection screen 400 may be used interchangeably with the projection screen 112 in the projection system 100. In this embodiment, the pump 408 may operate from a storage location in the housing 104.

Storage of the projection screen 400 may take place by deflating the frame 404 and storing the projection screen material 412 within a screen cavity of a housing.

Figure 5:
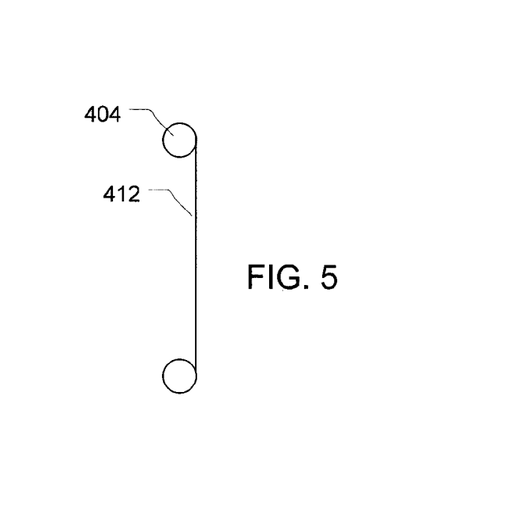
FIG. 5 illustrates a cross-sectional view of the projection screen of FIG. 4, in accordance with an embodiment of the present invention.

FIG. 5 illustrates a cross-sectional view of the projection screen of FIG. 4, in accordance with an embodiment of the present invention. In this embodiment, the projection screen material 412 may be folded over the frame 404.

Figure 6A:
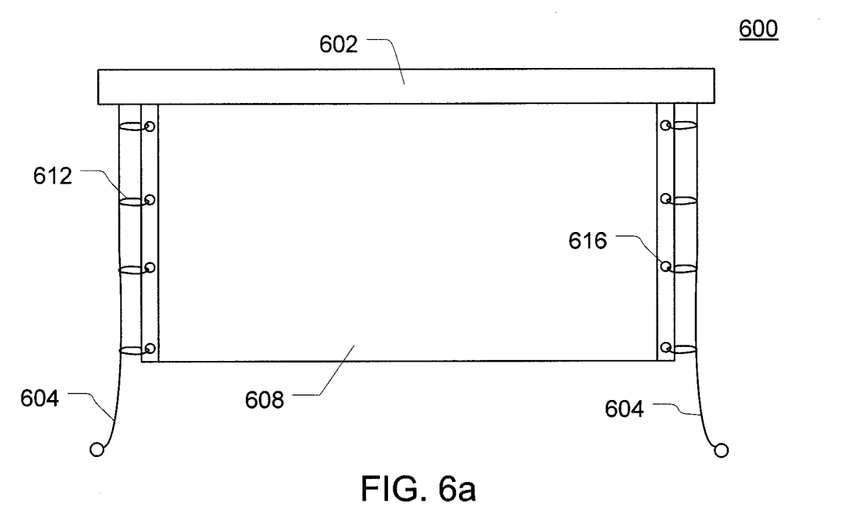
FIGS. 6a-6b illustrate front views of a tensioned projection screen in various stages, in accordance with an embodiment of the present invention.

FIG. 6 illustrates a front view of a tensioned projection screen 600, in accordance with an embodiment of the present invention. In this embodiment, a storage structure 602 may store screen material 608. Supporting features, such as cables 604, may extend substantially orthogonal to the storage structure 602. The cables 604 may also be stored in the storage structure 602 and may be retractably deployed by a constant-force spring, for example. In other embodiments, the cables 604 may be semipermanently disposed. In various embodiments, the cables 604 may be coupled to, or independent from, the storage structure 602.

In one embodiment, the screen material 608 may be coupled to the cables 604. More particularly, grommets 612 may be coupled to the cables 604 and attachment points, e.g., eyelets 616, found on a perimeter of the screen material 608. While eyelets 616 are shown on two edges of the screen material 608, other embodiments may additionally/alternatively have them elsewhere.

Figure 6B:
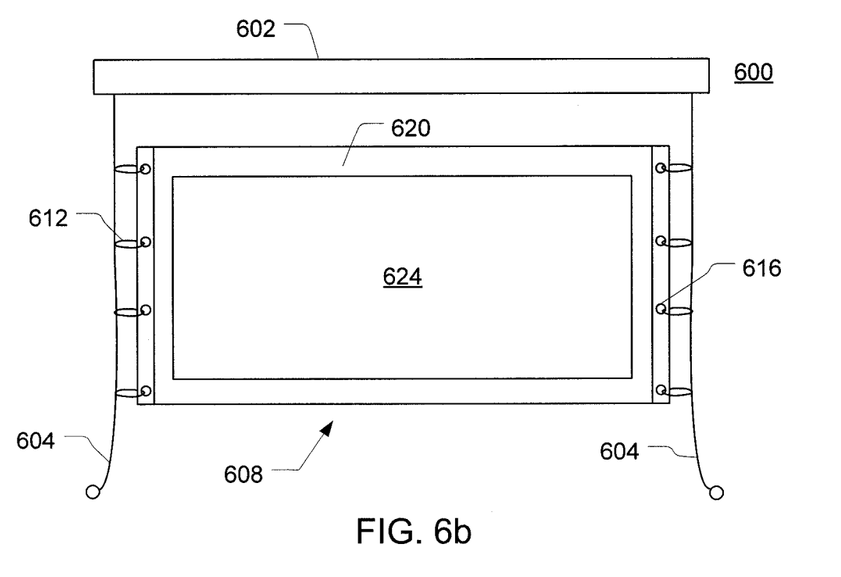

FIG. 6b illustrates an embodiment where the screen material 608 may be pulled completely out of the storage structure 602 so that the perimeter of the screen material 608 may be exposed in its entirety. Suspension of the screen material 608 may cause the appearance of a floating screen.

In an embodiment, the screen material 608 may include a border 620 surrounding a viewing area 624. The viewing area 624 may have optical attributes suitable to facilitate viewing of images projected thereon. The border 620 may have optical attributes suitable to provide contrast to the viewing area 624, e.g., a black matte to absorb light. Borders, similar to border 620, may be applied to any other projection screen discussed herein.

Suspension of the screen material 608 may also facilitate positioning of the viewing area 624 and/or concealment of the storage structure 602. For example, the storage structure 602 may be disposed in/at a high ceiling and the screen material 608 may be pulled down, along the cables 604, to the desired location.

In various embodiments, the screen material 608 may include a top perimeter edge having one or more grommets/attachment points similar to the side edges. This may facilitate storage and/or vertical tensioning of the screen material 608. In other embodiments, other mechanical features may be additionally/alternatively employed to facilitate storage and/or vertical tensioning of the screen material 608

While the above embodiment illustrates the projection screen 600 being deployed by the screen material 608 being pulled down from the storage structure 602, in other embodiments, the projection screen 600 may be deployed by the screen material 608 being pulled up or sideways out of the storage structure 602.

Figure 7A:
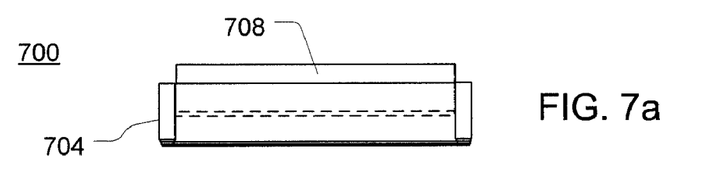
FIGS. 7a-7b illustrate a front view of a projection screen with telescopic frame segments in deployed and stored states, in accordance with an embodiment of the present invention.
Figure 7B:
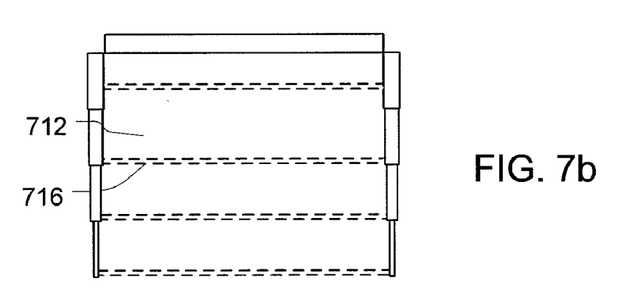

FIG. 7a illustrates a rear view of a projection screen 700 with telescopic frame segments 704 in a stored state, in accordance with an embodiment of the present invention. In the stored state, a storage structure 708 may house screen material 712 and the frame segments 704 may be collapsibly disposed within one another. In the deployed state depicted in FIG. 7b, the frame segments 704 may be extended, along with the screen material 712. Braces 716 may be positioned between the frame segments 704 to facilitate crosswise support.

Figure 8:
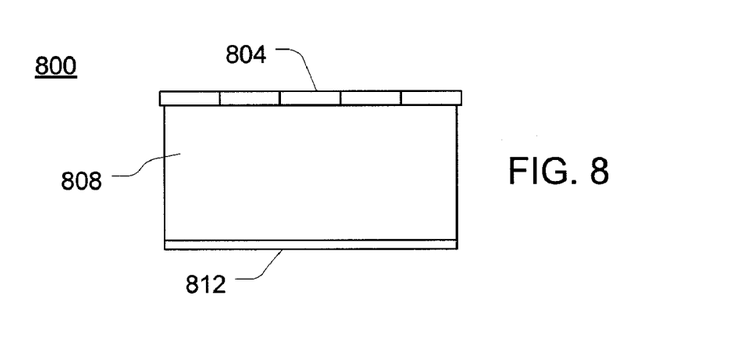
FIG. 8 illustrates a front view of a projection screen using variable-tensioned segmented rollers, in accordance with an embodiment of the present invention.

FIG. 8 illustrates a front view of a projection screen 800 using variable-tensioned segmented rollers 804, in accordance with an embodiment of the present invention. In this embodiment, screen material 808 may be coupled to the segmented rollers 804 and a cross-bar 812. This embodiment may facilitate the application of different quantities of tension across the face of the screen 800. For example, in one embodiment, in order to flatten the edges, the rollers 804 toward the outside may provide a greater tension than the rollers 804 toward the middle. The tension applied by the rollers 804 may be countered by the weight of the cross-bar 812 or by coupling the cross-bar 812 to a structure.

In various embodiments, the rollers 804 may be disposed within a housing (not shown).

Figure 9:
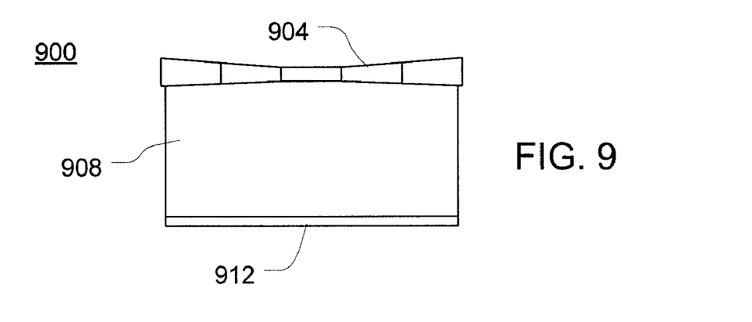
FIG. 9 illustrates a front view of a projection screen using shape-segmented rollers, in accordance with an embodiment of the present invention.

FIG. 9 illustrates a front view of a projection screen 900 using shaped-segmented rollers 904, in accordance with an embodiment of the present invention. In this embodiment, a screen material 908 may be coupled to the rollers 904 and a cross-bar 912. The shape of some of the rollers 904, e.g., the trapezoidal shape of the outer rollers 904, may facilitate the provision of both a vertical force and a horizontal force. The combination of the vertical and horizontal forces may facilitate even tension across the face of the projection screen 900. In one embodiment, the cross-bar 912 may be curved in order to complement this tension. In this embodiment, the curvature of the cross-bar 912 may be within a border section.

Those skilled in the art will recognize that the trapezoidal shape of the outer rollers 904 is as depicted in the plan view illustrated in FIG. 9. The actual three-dimensional geometrical shape may be, e.g., a conical portion having a diameter that increases with an increased distance from a vertical centerline of the projection screen 900.

FIGS. 10a-10e illustrate a flexible frame projection screen 1000 in a deployed state, transitional states, and a stored state, respectively, in accordance with an embodiment of the present invention. The projection screen 1000 may have a frame 1004 with screen material 1008 attached to it, substantially at the perimeter of the screen material 1008. The frame 1004 may be constructed of a material, e.g., spring steel, which is sufficiently flexible to allow the projection screen 1000 to be repeatedly transitioned between deployed and stored states through a combination of bending, twisting, rotating, folding, etc.

Figure 10A:
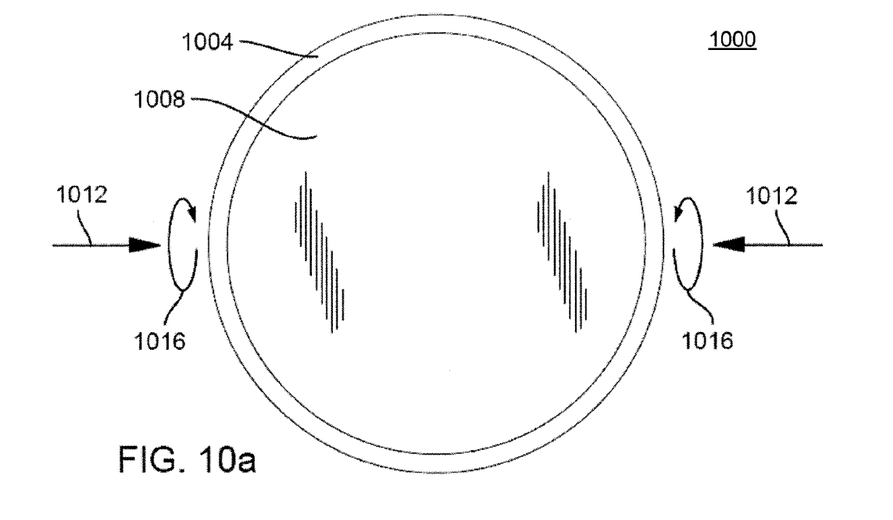
FIGS. 10a-10e illustrate various views of a flexible frame projection screen in various stages of deployment, in accordance with an embodiment of the present invention.
Figures 10B, 10C, 10D, 10E:
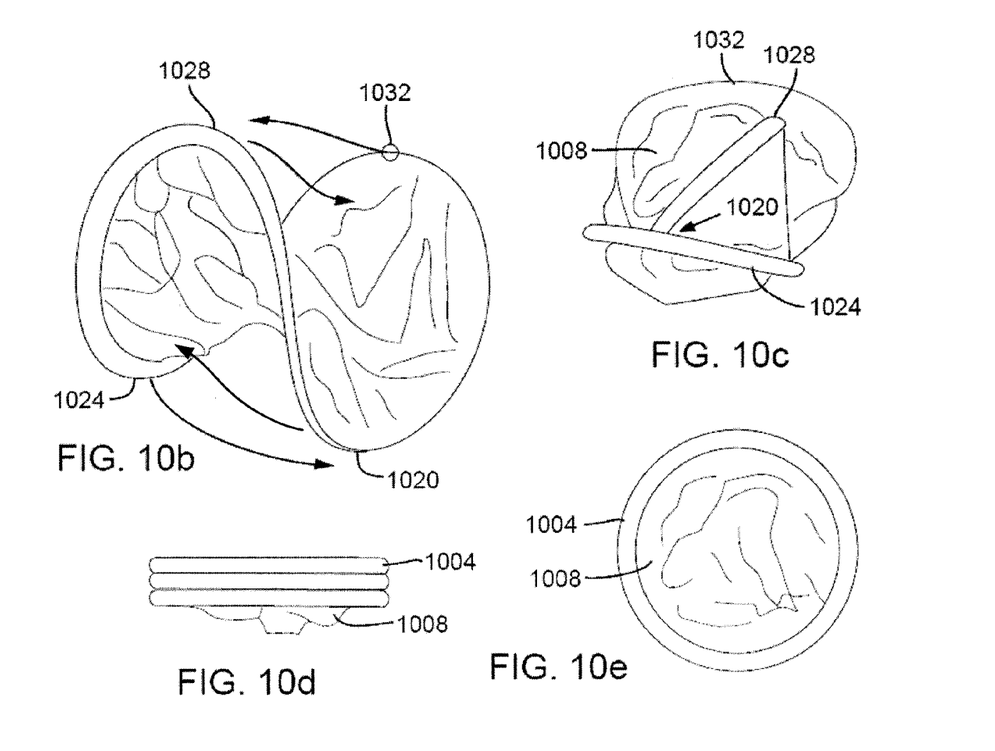

In an embodiment, the frame 1004 may be sufficiently flexible to allow the projection screen 1000 to transition from the deployed state, illustrated in FIG. 10a, to the stored state, illustrated in FIG. 10d, and vice versa. In an embodiment, transition of the projection screen 1000 from the deployed state to the stored state may be initiated by a combination of transitional forces, e.g., compressive forces 1012 and rotational forces 1016, being applied to a plurality of perimeter points of the frame 1004.

FIGS. 10b-10c illustrate transitional states of the projection screen 1000 in accordance with an embodiment of the invention. The bending and compressing of the frame 1004 may release tension of the screen material 1008. In this embodiment, a perimeter point 1020 may then be folded inside of perimeter point 1024. Similarly, perimeter point 1028 may be folded inside of perimeter point 1032.

FIGS. 10d-10e respectively illustrate a side view and a front view of the projection screen 1000 in the stored state in accordance with embodiments of this invention. In this embodiment, the projection screen 1000 has been folded over onto itself approximately three times. Accordingly, the surface area that the projection screen 1000 occupies while in the stored state may be approximately one-ninth of the surface area that the projection screen 1000 occupies while in the deployed state. In other embodiments, the projection screen 1000 may be folded in a different manner resulting in other surface area reductions. Various embodiments of the present invention may include a surface area of the stored state being no more than 50% of the surface area of the deployed state.

The projection screen 1000 may be transitioned from the stored state to the deployed state in a reverse manner with substantially equal and opposite transition forces applied. As used herein a compressive force may be positive or negative in order to compress or expand the frame 1004, respectively. Similarly, as used herein a retractive force may be positive or negative in order to retract or extract the frame 1004, respectively.

Figure 11:
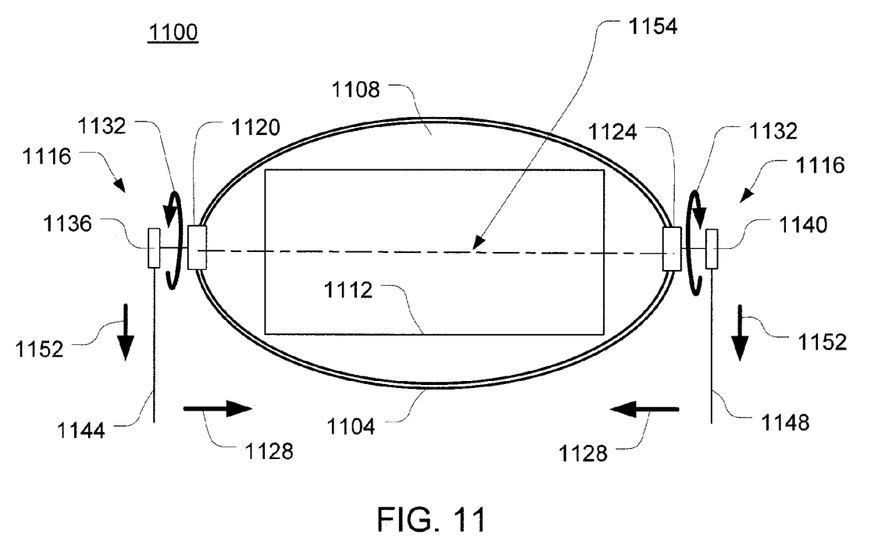
FIG. 11 illustrates a flexible frame projection screen, in accordance with an embodiment of the present invention.

While the projection screen 1000 in the deployed state is shown with a circular aspect from the front view, other embodiments may include deployed state aspects other than circular, e.g., substantially rectangular or elliptical. For example, FIG. 11 illustrates a projection screen 1100 having a substantially elliptical deployed aspect from the front view, in accordance with an embodiment of this invention.

In this embodiment, the projection screen 1100 may have a flexible frame 1104, which may be similar to frame 1004 described above. The projection screen 1100 may also include screen material 1108 attached to the frame 1104 at, or near, the perimeter of the screen material 1108. The screen material 1108 may include a border 1112 similar to the border discussed and described above.

In this embodiment, the frame 1104 may be divided into a first portion and a second portion by an axis 1154 having ends. In this embodiment, the projection screen 1100 may also include a mechanical actuator 1116 coupled to the frame 1104 at anchors 1120 and 1124 located at perimeter points of the frame 1104. The mechanical actuator 1116 may be capable of transitioning the projection screen 1100 between a deployed and stored state in a manner similar to the transitioning of the projection screen 1000 shown and described above. In this embodiment, the mechanical actuator 1116 may provide a combination of compressive forces 1128 and rotational forces 1132 upon the frame 1104 to transition the projection screen 1100 from the deployed state to the stored state. The mechanical actuator 1116 may provide rotational forces 1132 by rotating mechanisms 1136 and 1140 coupled to respective anchors 1120 and 1124. The mechanical actuator 1116 may provide the compressive forces 1128 by moving supports 1144 and 1148 toward one another. The supports 1144 and 1148 may be on a track (not shown) located within a storage device.

The mechanical actuator 1116 may also provide retractive forces 1152 via the supports 1144 and 1148. For example, in an embodiment using the projection screen 1100 within the system 100 shown and described in FIG. 1, the mechanical actuator 1116 may fold the frame 1104 (by applying compressive forces 1128 and rotational forces 1132) over onto itself and then retract the projection screen 1100 within the housing 104 (by applying retractive forces 1152).

In various embodiments, the mechanical actuator 1116 may provide transitional forces in other manners. Furthermore, in various embodiments the mechanical actuator 1116 may be automatically or manually operated.

In various embodiments, the projection screens 400, 600, 700, 800, 900, 1000, and/or 1100 may be used interchangeably with the projection screen 112 within the projection system 100.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A projection screen comprising:
   screen material having a perimeter and optical attributes suitable to facilitate viewing of images projected thereon; and
   a flexible frame having an axis dividing the flexible flame into a first and second portion, the flexible frame attached to the screen material substantially at said perimeter to support the screen material when the projection screen is in an expanded projection state, and the flexible frame being further sufficiently flexible to allow the projection screen to be twisted into a contracted storage state when transition forces are applied at a plurality of perimeter points, the projection screen in the contracted storage state occupying a surface area no more than 50% of a surface area occupied by the projection screen in the expanded projection state, the transition forces including two rotational forces applied to the first portion, the two rotational forces being applied in opposite directions about the axis.

2. The projection screen of claim 1, wherein the projection screen further comprises:
   a mechanical actuator coupled to the flexible frame and configured to provide the transition forces.

3. The projection screen of claim 2, further comprising:
   a first anchor coupled to the flexible frame at a first end on the axis, the first anchor divided by the axis into a first and second part, with the first part of the first anchor coupled to the flexible frame in the first portion and the second part of the first anchor coupled to the flexible frame in the second portion, a first rotational force of the two rotational forces applied to the first portion through the first part of the first anchor; and
   a second anchor coupled to the flexible frame at a second end on the axis, substantially opposite the first end, the second anchor divided by the axis into a first and second part, with the first part of the second anchor coupled to the flexible frame in the first portion and the second part of the second anchor coupled to the flexible frame in the second portion, a second rotational force of the two rotational forces applied to the first portion through the first part of the second anchor.

4. The projection screen of claim 3, wherein the mechanical actuator further comprises:
   a rotating mechanism coupled to the first anchor and configured to contribute a rotational force to the transitional forces.

5. The projection screen of claim 4, wherein the mechanical actuator further comprises:
   a first support coupled to the rotating mechanism; and a second support coupled to the second anchor; and the mechanical actuator configured to contribute a compressive force to the transitional forces by moving the first and second supports relative to one another.

6. The projection screen of claim 1, wherein the projection screen in the expanded projection state comprises a substantially elliptical, circular or rectangular aspect.

7. The projection screen of claim 1, wherein the flexible frame is configured to be folded over onto itself one or more times when the projection screen is in the contracted storage state.

8. A system comprising:
   a projection screen including
      screen material having a perimeter and optical attributes suitable to facilitate viewing of images projected thereon; and
      a flexible frame having an axis dividing the flexible flame into a first and second portion, the flexible frame attached to the screen material substantially at said perimeter to support the screen material when the projection screen is in an expanded projection state, and the flexible frame being further sufficiently flexible to allow the projection screen to be twisted into a contracted storage state when transition forces are applied at a plurality of perimeter points, the transition forces including two rotational forces applied to the first portion, the two rotational forces being applied in opposite directions about the axis; and
   a housing configured to house a projection device, to store the projection screen when in the contracted storage state, and to display the projection screen when in the expanded projection state in a manner to facilitate viewing of an image projected by the projection device.

9. The system of claim 8, further comprising:
   a mechanical actuator configured to provide transitional forces to facilitate transition of the projection screen between the expanded projection state and the contracted storage state.

10. The system of claim 8, wherein the projection screen comprises:
    the projection screen in the contracted storage state occupying a surface area no more than 50% of a surface area occupied by the projection screen in the expanded projection state.

11. The system of claim 8, wherein the projection screen comprises:
    first and second supports; and
    screen material coupled to the first and second supports.

12. A method comprising:

untwisting a projection screen from a contracted storage state to an expanded projection state by applying transition forces to a plurality of perimeter points of a flexible frame of the projection screen, the flexible frame having an axis dividing the flexible flame into a first and second portion, screen material, having optical attributes suitable to facilitate viewing of images projected thereon, attached to the flexible frame substantially at a perimeter of the screen material;

applying transition forces including applying two rotational forces to the first portion, the two rotational forces being applied to opposite directions about the axis; and projecting, with a projecting device, an image onto the projection screen while the projection screen is in the expanded projection state.

13. The method of claim 12, wherein said applying of transitional forces includes:

applying at least one force chosen from a compressive force or a retractive force to the plurality of perimeter points.

14. The method of claim 12, further comprising:

operating the projection device from within a projector cavity of a housing.

15. The method of claim 14, wherein said untwisting of the projection screen is done automatically.

* * * * *

UNITED STATES PATENT AND TRADEMARK OFFICE
CERTIFICATE OF CORRECTION

PATENT NO. : 7,397,603 B2  
APPLICATION NO. : 11/381895  
DATED : July 8, 2008  
INVENTOR(S) : Mark Peterson et al.

It is certified that error appears in the above-identified patent and that said Letters Patent is hereby corrected as shown below:

Col. 7, line 40 "...the flexible flame..." should read --...the flexible frame...--;

Col. 8, lines 35-36, "...the flexible flame..." should read --...the flexible frame...--;

Col. 9, line 6, "...the flexible flame..." should read --...the flexible frame...--;

Signed and Sealed this

Twenty-eighth Day of July, 2009

JOHN DOLL  
*Acting Director of the United States Patent and Trademark Office*